(No Model.)

R. SHAND.
ALTERNATING CURRENT METER.

No. 590,650. Patented Sept. 28, 1897.

WITNESSES.
A. H. Abell.
A. F. Macdonald.

INVENTOR.
Robert Shand
By Geo. R. Benedict
Atty.

UNITED STATES PATENT OFFICE.

ROBERT SHAND, OF LYNN, MASSACHUSETTS, ASSIGNOR TO THE GENERAL ELECTRIC COMPANY, OF NEW YORK.

ALTERNATING-CURRENT METER.

SPECIFICATION forming part of Letters Patent No. 590,650, dated September 28, 1897.

Application filed March 12, 1897. Serial No. 627,133. (No model.)

*To all whom it may concern:*

Be it known that I, ROBERT SHAND, a citizen of the United States, residing at Lynn, county of Essex, State of Massachusetts, have invented certain new and useful Improvements in Alternating-Current Meters, (Case No. 544,) of which the following is a specification.

My present invention relates to an electric meter of the induction type which will register accurately the true energy on inductive circuits irrespective of the phase relation between current and electromotive force in the circuit. As is now well understood by electricians, the current tends to lag behind the electromotive force in circuits supplying induction-motors or other inductive loads, and this lag is apt to vary from time to time under different conditions of load. Certain meters have heretofore been proposed which have been specially designed for avoiding inaccuracies due to such lagging currents, and my present invention is an improvement upon meters especially adapted for this kind of work, though the meters will operate also satisfactorily on non-inductive circuits.

Figure 1:
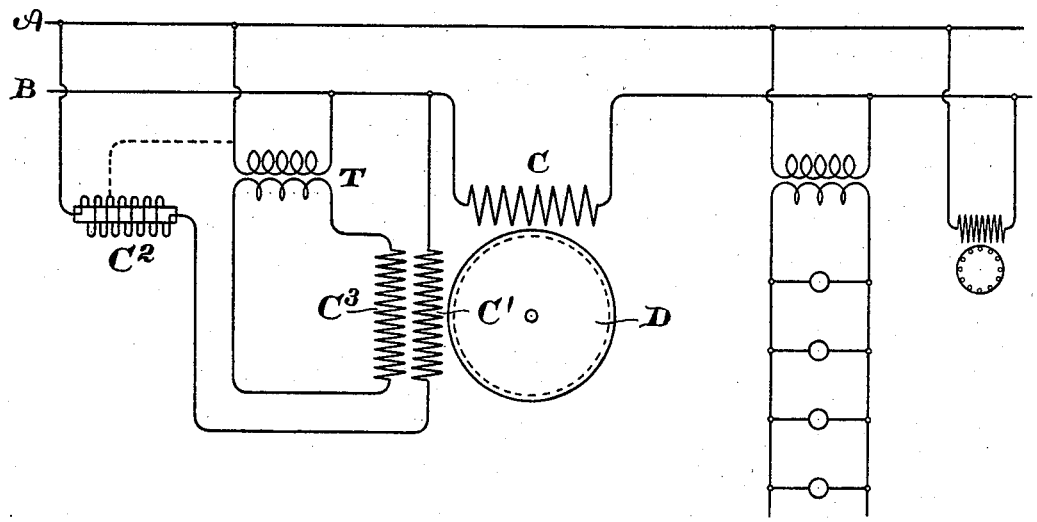
Figure 2:
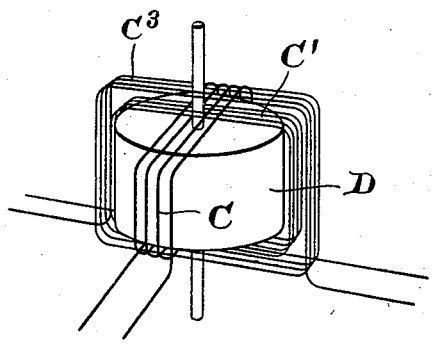
Figure 3:
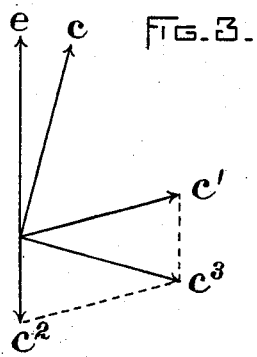

In the accompanying drawings, Figures 1, 2, and 3 are diagrams illustrating the invention and explaining its mode of operation.

In Fig. 1, A B are the mains of an alternating-current circuit. The meter comprises a current-coil C, carrying current which may be equal in value to the total main-line current or a definite proportional part thereof. I show coil C included in one of the mains B, though a number of equivalent arrangements are well understood by electricians. The current in this coil is in phase with the current in the main-line circuit and the self-induction of the coil is small, so that the current will be practically in phase with the electromotive force, unless lagging currents are set up in the circuit by inductive load. A potential coil C' is coupled across the mains A B and is made of high self-induction, so as to lag the current in this circuit behind the electromotive force through an angle somewhat less than ninety degrees. A self-induction coil $C^2$ is shown included in series in this circuit for increasing the lag. As is well understood in the art, the current in coils C and C' can in in this way be made to differ in phase by an angle somewhat less than ninety degrees—say, for example, eighty degrees to eighty-five degrees. In order to increase the angle of phase difference to ninety degrees, I employ a transformer T, whose primary is connected across the mains A B and whose secondary is closed through a coil $C^3$, wound in conjunction with the potential coil C', so that both coils have a common magnetic axis. The secondary or rotating member of the meter may be of any desired construction, and this will be connected to the recording mechanism through gearing, as usual. The rotating member is shown in the diagram at D.

In Fig. 2 the arrangement of the coils relatively to the armature of the meter is shown. Here the armature is shown as a cylinder D. The current-coil C of coarse wire surrounds the cylinder in one plane, while the potential coil C' and supplementary potential coil $C^3$ are superimposed and surround the cylinder in a plane at right angles to coil C. Of course the design of the meter when constructed may vary greatly.

In Fig. 3 I illustrate a diagram intended to make clear the mode of operation of the invention. Let the vertical line $e$ represent the electromotive force in the circuit A B. Then the current in coil C will lag slightly, and this lag will increase with the load when inductive in character. For purposes of illustration let the line $c$ represent the current when the load is non-inductive. The current in coil C' is lagged through a much greater angle and may be represented by the line $c'$ nearly ninety degrees from the electromotive force. The current in coil $C^3$ will lag behind the current in C' by an angle differing somewhat, according to the resistance and self-induction in the coil and in the transformer; but for purposes of illustration this current may be represented by a line $c^2$ one hundred and eighty degrees from the electromotive force on the consumption-circuit. The two currents $c'$ and $c^2$ will then have a magnetizing effect corresponding to the resultant of $c'$ and $c^2$, which is represented by line $c^3$ ninety degrees from $c$. Hence by properly proportioning the windings and adjusting the resistance and self-induction of the circuits in a manner which will be understood from the foregoing explanation I secure the magnetic fluxes which are proper in value and phase for registering accurately the true energy in alternating-current circuits even though the load be highly inductive. I prefer to connect the transformer T across the consumption-circuit, as shown in full lines; but it may be coupled so as to form a partial shunt. For example, I show in dotted lines one terminal of transformer T connected to an intermediate point in the induction-coil $C^2$ instead of leading directly to main A, as in full lines.

What I claim as new, and desire to secure by Letters Patent of the United States, is—

1. In an induction-meter the combination of a current-coil, a potential coil, a transformer whose primary is coupled across the circuit-mains, and a third coil in the secondary circuit of the transformer, all said coils being in inductive relation to the rotating armature, substantially as described.

2. The combination in an induction-meter of a current-coil, a potential coil in a shunt-circuit of high self-induction, and a third coil connected across the mains inductively through a transformer, said potential coils cooperating to establish a magnetomotive force, substantially ninety degrees from the magnetomotive force of the current-coil when the circuit is non-inductive, as described.

3. The combination in an alternating-current induction-meter of a current-coil, a potential coil in a shunt-circuit of high self-induction, lagging the current therein somewhat less than ninety degrees from the current in the series coil, a third potential coil superimposed upon said first-named potential coil, and a transformer whose primary is connected across the consumption-circuit and secondary to said third coil, the volts and phase of the currents in said potential circuits being so chosen that their action upon the armature is equivalent to that of a simple potential coil carrying current ninety degrees dephased from the current in the third coil.

In witness whereof I have hereunto set my hand this 10th day of March, 1897.

ROBERT SHAND.

Witnesses:
JOHN W. GIBBONEY,
HENRY O. WESTENDARP.